Patented July 28, 1925.

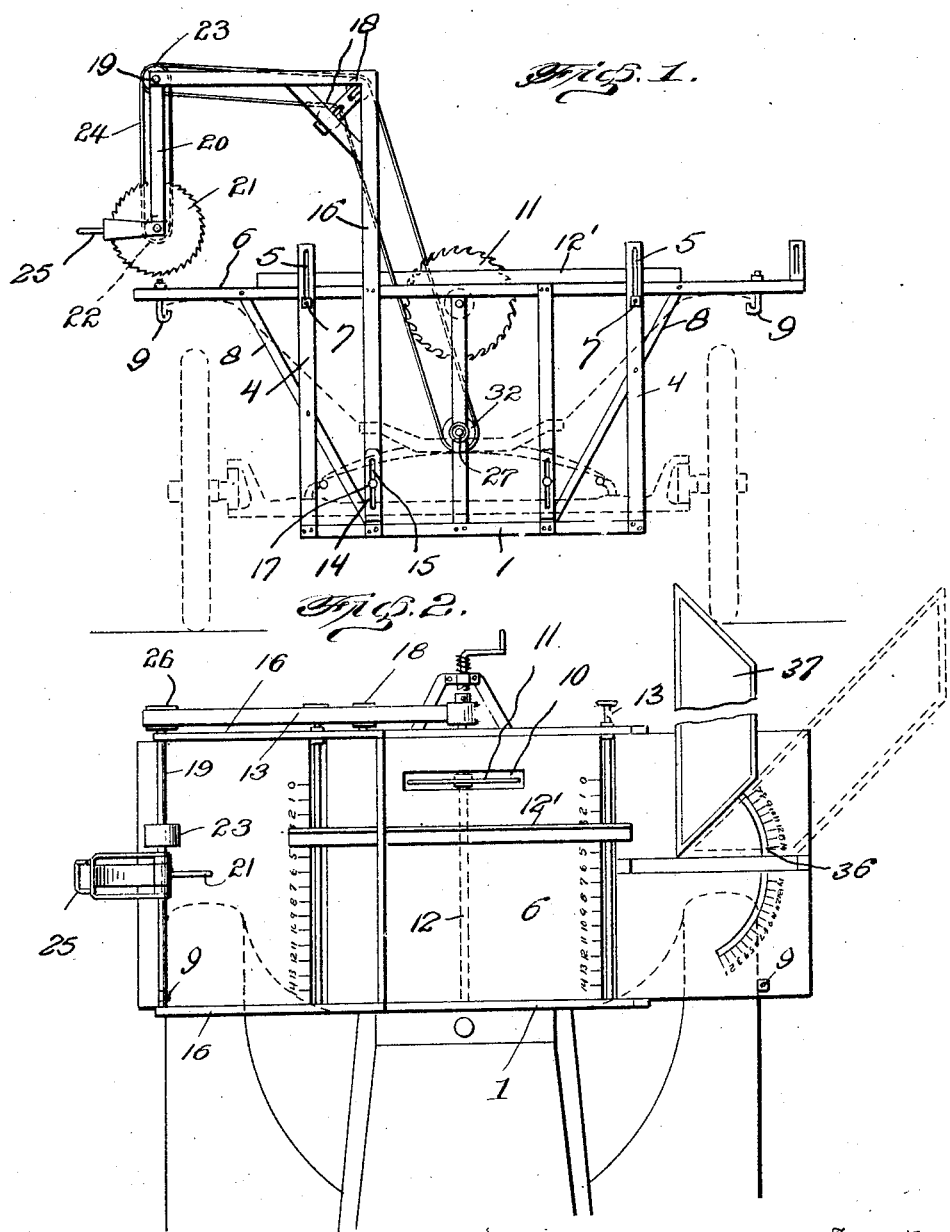

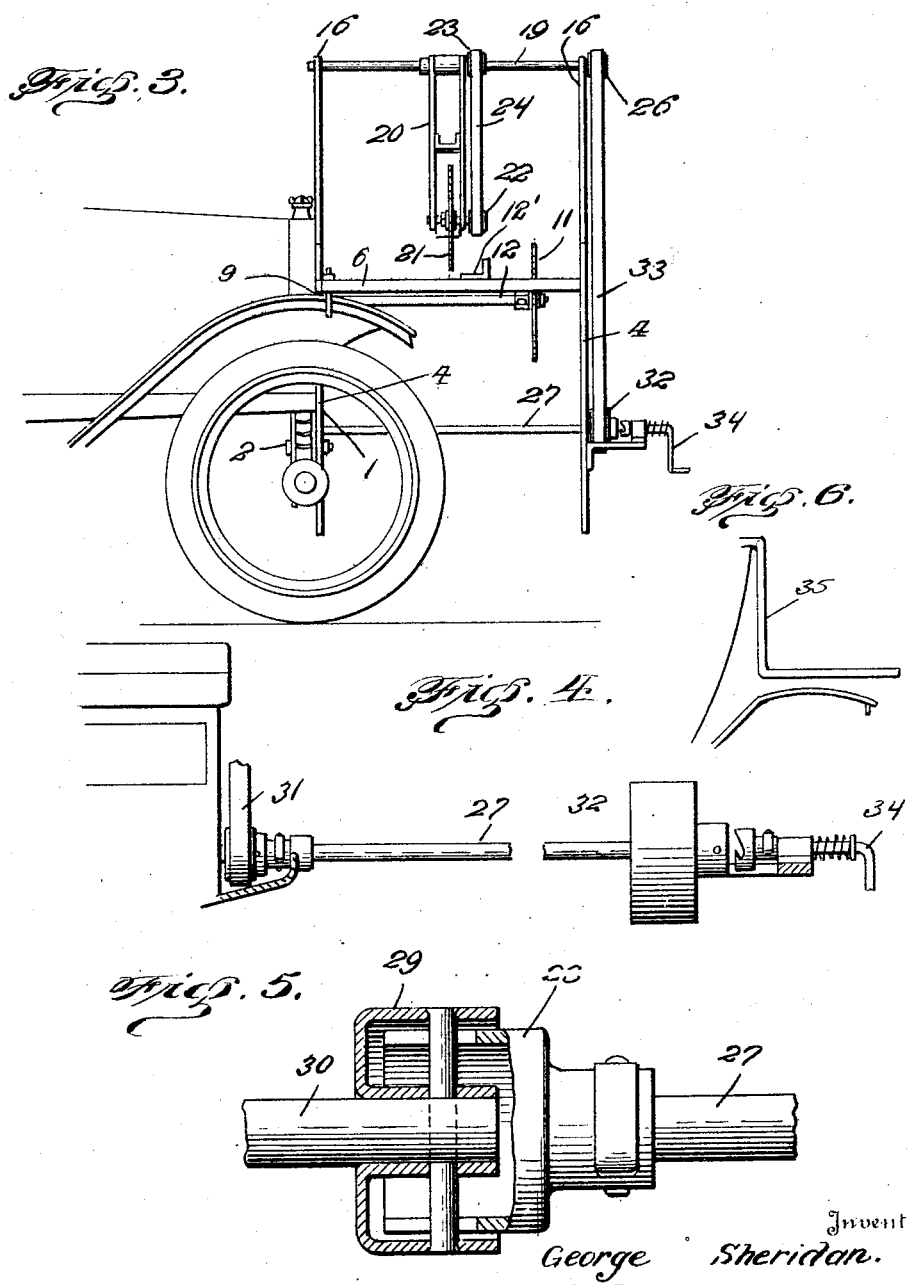

1,547,239

UNITED STATES PATENT OFFICE.

GEORGE SHERIDAN, OF DEARBORN, MICHIGAN.

POWER SAW ATTACHMENT.

Application filed February 28, 1924. Serial No. 695,777.

*To all whom it may concern:*

Be it known that I, GEORGE SHERIDAN, a citizen of the United States, residing at Dearborn, in the county of Wayne and State of Michigan, have invented certain new and useful Improvements in Power Saw Attachments, of which the following is a specification.

This invention relates to saw attachments especially adapted to be applied to automobile machines, and it consists in the novel features hereinafter described and claimed.

An object of the invention is to provide a saw structure in the form of an attachment, and including a plurality of saw blades mounted upon shafts adapted to be rotated by power applied to them from the engine of the automobile machine, and through connections provided with the crank shaft and the fan shaft of the automobile machine.

The structure also includes the frame adapted to be applied to the axle and fenders of the automobile machine, and which carries a table adapted to support the material during the sawing operation. One of the saw blades is designed and intended to be used as a rip saw, and another of the saw blades is intended and designed to be used as a cross grain saw. The last mentioned saw blade or one similar to the same may be used for cutting mitres in the material.

In the accompanying drawings:

Figure 1 is a front elevation of the saw attachment.

Figure 2 is a top plan view of the same.

Figure 3 is a side elevation of the same.

Figure 4 is an enlarged detailed side elevation of a shaft of the attachment which is adapted to be connected with the crank shaft of the automobile machine.

Figure 5 is an enlarged detailed view of the coupling between the crank shaft and the shaft of the attachment, and showing parts in section.

Figure 6 is a fragmentary edge elevation of a bracket adapted to be applied to the rear portion of the body of the automobile machine, and to be used for holding the material positioned upon the table during the cross cutting operation.

The saw attachment comprises the frame 1 which is adapted to be secured to the front axle of the automobile machine by means of securing devices 2. The rear side of the frame is in close proximity to the front side of the radiator of the automobile machine. The frame 1 includes standards 4, which are provided at their upper ends with slots 5. A table 6 is provided with securing devices 7 which pass through the slots 5 and serve as means whereby the table may be secured at adjusted positions upon the frame. Braces 8 are connected at their upper ends with the end portions of the table 6 and connected at their lower ends with the frame 1 and the said braces support the end portions of the table. Hooks 9 are provided at the end portions of the table and are adapted to be engaged under the outer edges of the fenders of the automobile machine when the attachment is applied. The table 6 is provided at its intermediate portion with a longitudinally disposed slot 10, and a circular saw blade 11 is disposed through said slot 10. The blade 11 is mounted upon a shaft 12 which is adapted to be connected in an appropriate manner with the ends of the fan shaft of the automobile machine. A guide member $12^1$ is mounted upon the table 6 and screw shafts 13 are journaled upon the table. The said shafts 13 engage the guide member $12^1$ and by turning the shafts 13 the member $12^1$ may be moved toward or away from the saw 11. The guiding edge of the member $12^1$ is disposed parallel with the plane of the saw 11.

The saw 11 is designed and intended to be used as a rip saw, and the material is passed over the table 6 with its edge in contact with the edge of the guide member. The saw 11 rotates in unison with the fan shaft of the automobile machine, and as the material passes the saw, it is ripped along the line of the incision made by the saw.

Upwardly disposed lugs 14 are mounted upon the lower portion of the frame 1, and are provided with longitudinally disposed slots 15; bracket arms 16 are provided at their lower ends with bolts 17, which are received in the slots 15 and serve as means for adjustably securing the bracket arm with relation to the frame 1 and table 6. The upper portions of the bracket arms 16 are disposed over the table 6. Spaced pulleys 18 are carried at the upper end of the bracket arms 16 and a shaft 19 is journalled at the outer ends of the bracket arms 16. A frame 20 is pivotally mounted at the intermediate portion of the shaft 19 and carries at its lower end a journalled saw blade 21. A pulley 22 is fixed to the shaft of the saw 21 and a pulley 23 is mounted upon the shaft 19. A belt 24 is trained around the pulleys 22 and 23 and is adapted to transmit rotary movement from the shaft 19 to the saw 21. A handle 25 is carried at the lower portion of the frame 20. A pulley 26 is mounted upon the end of the shaft 19. A shaft 27 is journalled for rotation in the lower portion of the frame 1 and is provided at its inner end with a coupling member 28 which engages in a coupling member 29 mounted upon the end of the crank shaft 30 of the automobile machine. The belt 31 which operates the fan shaft from the crank shaft is trained around the coupling member 29. A belt pulley 32 is mounted at the other portion of the shaft 27 and a belt 33 is trained around the pulleys 26 and 32 and is adapted to transmit rotary movement from the shaft 27 to the shaft 19. A crank starter is mounted at the forward side of the frame 1 and may be engaged with the shaft 27 in a usual manner for starting the shaft 27 and the crank shaft of the engine. A bracket 35 may be mounted upon the rear fender of the automobile machine or upon the body thereof, and may serve as a support for the end portion of a piece of material which is being cut by the saw blade 21. The blade 21 is designed and intended to be used for cutting the ends of the material squarely across or the said blade 21 serves the purpose of a cross cut saw. The mitering scale 36 is provided upon the upper surface of the table 6 at one end thereof and a mitering guide 37 is positioned upon the table 6 adjacent said scale. The brackets 16 may be removed from over that end portion of the table 6 as shown in Figures 1 and 2 and disposed over the opposite end thereof whereby the saw blade 21 is positioned above the mitering scale 36 and a piece of material may be presented to the saw blade and guided by the miter guide 37 whereby the end of the said material may be mitered off at the desired angle.

Having described the invention, what is claimed is:

A saw attachment for an automobile machine comprising a frame, a table adjustable thereon, a shaft journalled in the frame and adapted to be operatively connected with the crank shaft of the automobile machine, a second shaft journalled in the frame and adapted to be connected with the fan shaft of the automobile machine, a saw blade carried by the second mentioned shaft and disposed through the table, bracket arms adjustably mounted upon the frame and having end portions disposed about the table, a shaft journalled upon the bracket arms, means for rotating the shaft upon the bracket arms, from the first mentioned shaft, a frame hanging pendant from the shaft upon the bracket arms, a saw blade journalled in the last mentioned frame, and means connected with the last mentioned frame for manually swinging the frame.

In testimony whereof I affix my signature.

GEORGE SHERIDAN.